(12) United States Patent
Ishikawa et al.

(10) Patent No.: US 7,409,872 B2
(45) Date of Patent: Aug. 12, 2008

(54) VORTEX FLOW METER

(75) Inventors: Nobuyuki Ishikawa, Sayama (JP); Yuichi Saito, Sayama (JP)

(73) Assignee: Saginomiya Seisakusho, Inc., Tokyo (JP)

( * ) Notice: Subject to any disclaimer, the term of this patent is extended or adjusted under 35 U.S.C. 154(b) by 62 days.

(21) Appl. No.: 11/647,041

(22) Filed: Dec. 28, 2006

(65) Prior Publication Data

US 2008/0156105 A1  Jul. 3, 2008

(51) Int. Cl.
    *G01F 1/32* (2006.01)
(52) U.S. Cl. ............... 73/861.22; 73/861.18; 73/861.21
(58) Field of Classification Search .............. 73/861.18, 73/861.21, 861.22
    See application file for complete search history.

(56) References Cited

U.S. PATENT DOCUMENTS

| | | | |
|---|---|---|---|
| 3,645,132 A | * | 2/1972 | Rasmussen ............ 73/170.11 |
| 4,418,568 A | * | 12/1983 | Surman ............... 73/202.5 |
| 4,449,401 A | * | 5/1984 | Kaiser et al. ........... 73/202.5 |
| 6,276,218 B1 | * | 8/2001 | Waers ............... 73/861.22 |
| 6,412,353 B1 | * | 7/2002 | Kleven et al. .......... 73/861.22 |
| 6,615,673 B1 | * | 9/2003 | Cullie ............... 73/861.22 |

FOREIGN PATENT DOCUMENTS

| | | |
|---|---|---|
| JP | 1-107113 A | 4/1989 |
| JP | 2000-321102 A | 11/2000 |

* cited by examiner

*Primary Examiner*—Edward Lefkowitz
*Assistant Examiner*—Freddie Kirkland, III
(74) *Attorney, Agent, or Firm*—The Webb Law Firm, P.C.

(57) ABSTRACT

It is an object to provide a vortex flow meter with less measurement errors caused by a temperature change, a pressure change, and a mechanical vibration, and capable of performing a precise measurement regardless of conditions, in addition, to provide a vortex flow meter capable of sufficiently preventing corrosive chemicals that is a fluid to be measured from leaking from a measurement pipe line due to corrosion.

A vortex generator that generates the Karman vortex and a measurement pipe line in which a holder body housing a detecting element that detects an alternating force of the Karman vortex is disposed are made of a material having a small coefficient of linear thermal expansion such as a quartz glass, and the vortex generator and the holder body are fixed to the measurement pipe line by welding in an integrating manner.

8 Claims, 7 Drawing Sheets

VORTEX FLOW METER

FIELD OF THE INVENTION

The present invention relates to a vortex flow meter. More specifically, the present invention relates to a vortex flow meter suitable for a flow measurement of high temperature corrosive chemicals such as a cleaning solvent that is used in a semiconductor cleaning apparatus, in particular an improvement of a measuring accuracy.

BACKGROUND OF THE INVENTION

For the vortex flow meter, a vortex generator is disposed perpendicularly to a flow direction of a fluid to be measured in a measurement pipe line, the Karman vortex is generated by the vortex generator, and a flow rate of the fluid to be measured is measured by detecting an alternating force acted by the Karman vortex that is applied to a forced member disposed at the downstream of the vortex generator in the pipe line.

Japanese Laid-Open Patent Publication No. 2000-321102 discloses the vortex flow meter in which a measurement pipe line, a vortex generator, and a forced member that come into contact with corrosive chemicals are all made of a fluorocarbon resin as a vortex flow meter that can measure a flow rate of the corrosive chemicals for cleaning in a semiconductor cleaning apparatus.

For a semiconductor cleaning apparatus in recent years, a case has become increased in which a high temperature cleaning solvent is used. In such a semiconductor cleaning apparatus, a flow meter becomes a high temperature state. More specifically, a typical usage condition in an SPM cleaning is cleaning for approximately ten minutes at a temperature in the range of 100 to 120° C. using the chemicals of $H_2SO_4$ (sulfuric acid):$H_2O_2$ (hydrogen peroxide)=4:1. Moreover, there is demanded a cleaning at a higher temperature in the range of 160 to 170° C. to enhance a cleaning performance.

However, in the case in which the above described vortex flow meter made of a fluorocarbon resin is used for such an apparatus performing a cleaning at a high temperature, there is a problem that a measurement error occurs due to a temperature change since a coefficient of linear thermal expansion of the fluorocarbon resin is large to a temperature and a cross sectional area of a measurement pipe line of the flow meter increases as compared to a normal temperature (20° C.).

More specifically, since a coefficient of linear thermal expansion of the fluorocarbon resin is $12 \times 10^{-5°}$ $C.^{-1}$ at a temperature in the range of 20 to 100° C., a change in a cross sectional area of approximately 2% occurs at 20° C. and 100° C. and a measurement error occurs due to a temperature change. A flow rate is represented by the expression of Q=S×V (Q: flow rate, S: passage cross sectional area, V: flow velocity). In the case in which the passage cross sectional area S of a measurement pipe line increases due to a temperature change and the actual flow rate $Q_a$ is constant, the flow velocity V becomes lower, and the measured flow rate $Q_m$ is smaller than the actual flow rate $Q_a$. Moreover, in the case in which a shape of the measurement pipe line changes due to a pressure and the passage cross sectional area S becomes larger, it is thought that a measurement error becomes larger.

A fluorocarbon resin makes corrosive chemicals to permeate according to a lapse of time, thereby causing parts of a circuit board to be corroded. Moreover, since a creep easily occurs to a fluorocarbon resin in the case in which a temperature of a fluid to be measured is high, chemicals easily leak from a sealed section for a vortex flow meter using a sealing member to seal a corrosive fluid, thereby corroding parts of a circuit board and causing a failure.

Moreover, depending on a usage environment, a mechanical vibration is applied to a vortex flow meter from surroundings, and a measurement error may occur due to the vibration.

The present invention was made in order to solve the above problems of the prior art. An object of the present invention is to provide a vortex flow meter with less measurement errors caused by a temperature change, a pressure change, and a mechanical vibration, and capable of performing a precise measurement regardless of conditions.

Another object of the present invention is to provide a vortex flow meter capable of sufficiently preventing corrosive chemicals that is a fluid to be measured from leaking from a measurement pipe line due to corrosion.

DISCLOSURE OF THE INVENTION

A vortex flow meter related to the present invention is characterized by comprising:

a vortex generator that is disposed perpendicularly to a flow direction of a fluid to be measured in a measurement pipe line and that generates the Karman vortex, and a detecting element that is fixed to a holder body (a forced member) disposed at the downstream of the vortex generator in the pipe line and that detects an alternating force of the Karman vortex, wherein the measurement pipe line, the vortex generator, and the holder body are made of a material having a coefficient of linear thermal expansion of $3.25 \times 10^{-6°}$ $C.^{-1}$ or less at a temperature in the range of 0 to 200° C.

Moreover, a vortex flow meter related to the present invention is characterized in that the vortex generator and the holder body are fixed to the measurement pipe line by welding in an integrating manner. The welding is carried out in such a manner that a fluid to be measured will not leak outside.

In a preferable embodiment, the measurement pipe line, the vortex generator, and the holder body are made of the same glass material such as a borosilicate glass, a quartz glass and the like.

Moreover, it is preferable that a groove for attaching a dedicated joint between a glass-made measurement pipe line and a resin-made pipe line of an apparatus is formed along a circumference of the measurement pipe line at the peripheral section around the both edges of the measurement pipe line.

Furthermore, in a preferable embodiment, the measurement pipe line, the vortex generator, and the holder body are made of a material that prevents corrosive chemicals from leaking.

According to the present invention, since the measurement pipe line is formed by a material having a coefficient of linear thermal expansion in the above range such as a quartz glass and a borosilicate glass, a change in a passage cross sectional area of the measurement pipe line depending on a change in a temperature is small.

Consequently, even in the case in which a temperature of the measurement fluid is high to be approximately 200° C., a measurement can be carried out under the same condition as the normal temperature, and a measurement accuracy can be stable against a change in a temperature, thereby reducing a measurement error.

In the case in which a material of the measurement pipe line is a quartz glass, a change in a passage cross sectional area of the measurement pipe line depending on a change in a temperature is small, and a shape of the measurement pipe line is not changed by a pressure of a fluid in the measurement pipe line since a rigidity of the material is higher than a resin material of the prior art, thereby stabilizing a measurement accuracy against not only a change in a temperature but also a change in a pressure.

Moreover, a quartz glass has a high corrosion resistance against corrosive chemicals such as a mixed solvent of sulfuric acid and hydrogen peroxide, which are used as a cleaning solvent for a semiconductor cleaning apparatus, thereby preventing a fluid to be measured from leaking from the measurement pipe line due to corrosion. As a result, a circuit section and so on are not corroded, thereby preventing a failure from occurring.

According to the present invention, the vortex generator and the holder body are sealed and fixed to the measurement pipe line by welding, thereby preventing a fluid to be measured from leaking from the connecting section between the measurement pipe line and the vortex generator or the holder body due to corrosion. As a result, a circuit section and so on are not corroded, thereby preventing a failure from occurring. The fixing by welding is carried out by forming the vortex generator, the holder body, and the measurement pipe line by a glass material and by integrating them by welding.

Moreover, a vortex flow meter related to the present invention is characterized by further comprising a case body that is attached to the measurement pipe line by holding the measurement pipe line in an interposing manner through an elastic portion by using an upper case fixing body and a lower case fixing body that form the case body that is attached to the measurement pipe line.

As described above, the case body is hold while interposing the elastic member such as an O ring. Consequently, even in the case in which a mechanical vibration is applied to the vortex flow meter, the mechanical vibration is absorbed by the elastic portion, thereby reducing a measurement error caused by the mechanical vibration.

Moreover, the measurement pipe line is not directly in contact with the case body, a gap is formed between the measurement pipe line and the case body, and the measurement pipe line and the case body are fixed to each other through the elastic portion disposed in the gap. Consequently, even in the case in which a linear expansion of the measurement pipe line occurs due to a heat from a fluid to be measured, a contact pressure due to a direct contact is not applied to the measurement pipe line and the case body, and a stress caused by the linear expansion of the measurement pipe line is absorbed by the elastic portion, thereby preventing a damage of the case body and the measurement pipe line due to an excess pressure applied to them.

Furthermore, a semiconductor wafer cleaning system related to the present invention is characterized by comprising the above described vortex flow meter. The vortex flow meter, which is installed to a part of a pipe line for circulation that circulates a cleaning solvent to the cleaning chamber of a semiconductor wafer, monitors a flow rate of the cleaning solvent.

BEST MODE FOR CARRYING OUT THE INVENTION

Figure 1:
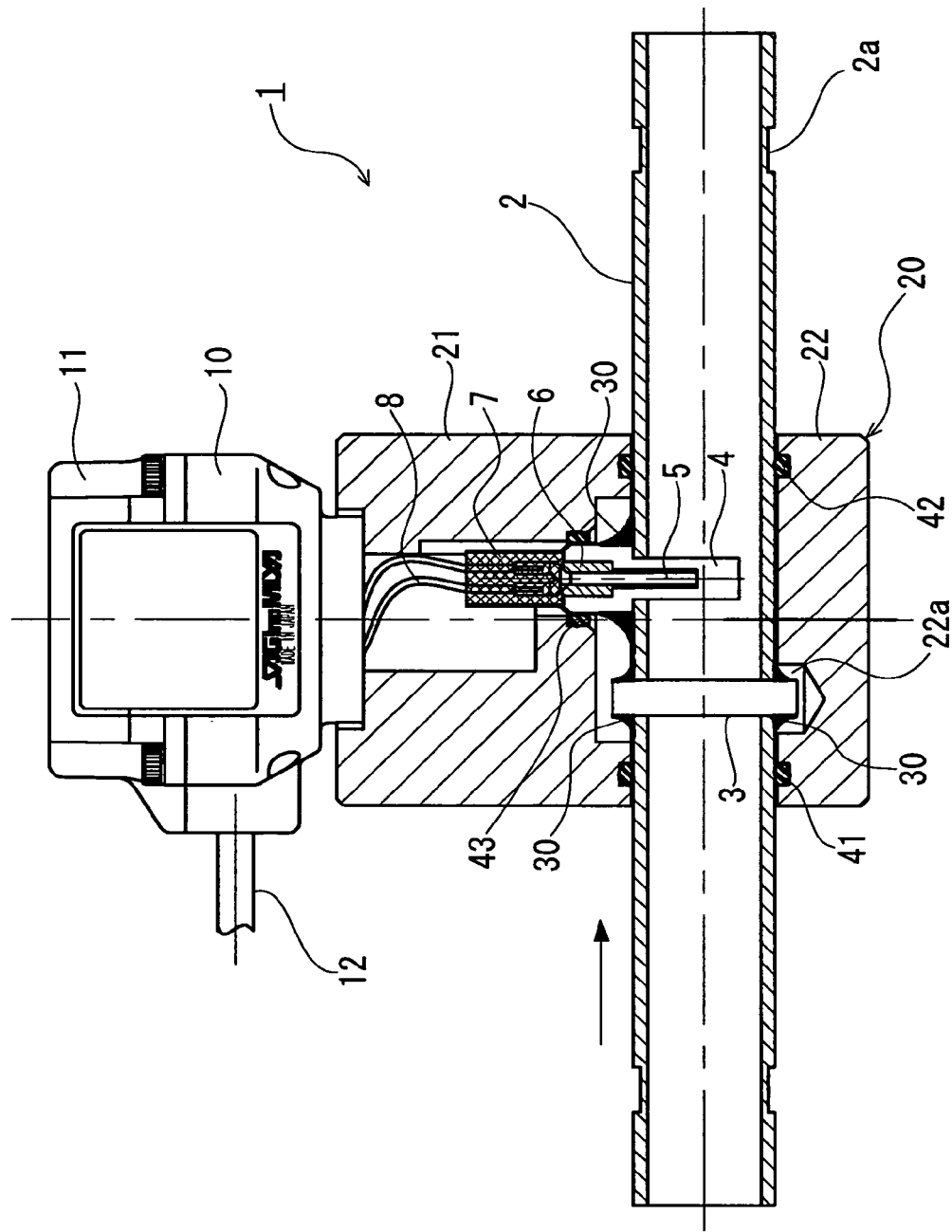
FIG. 1 is a cross-sectional view showing a vortex flow meter related to an embodiment of the present invention.
Figure 2:
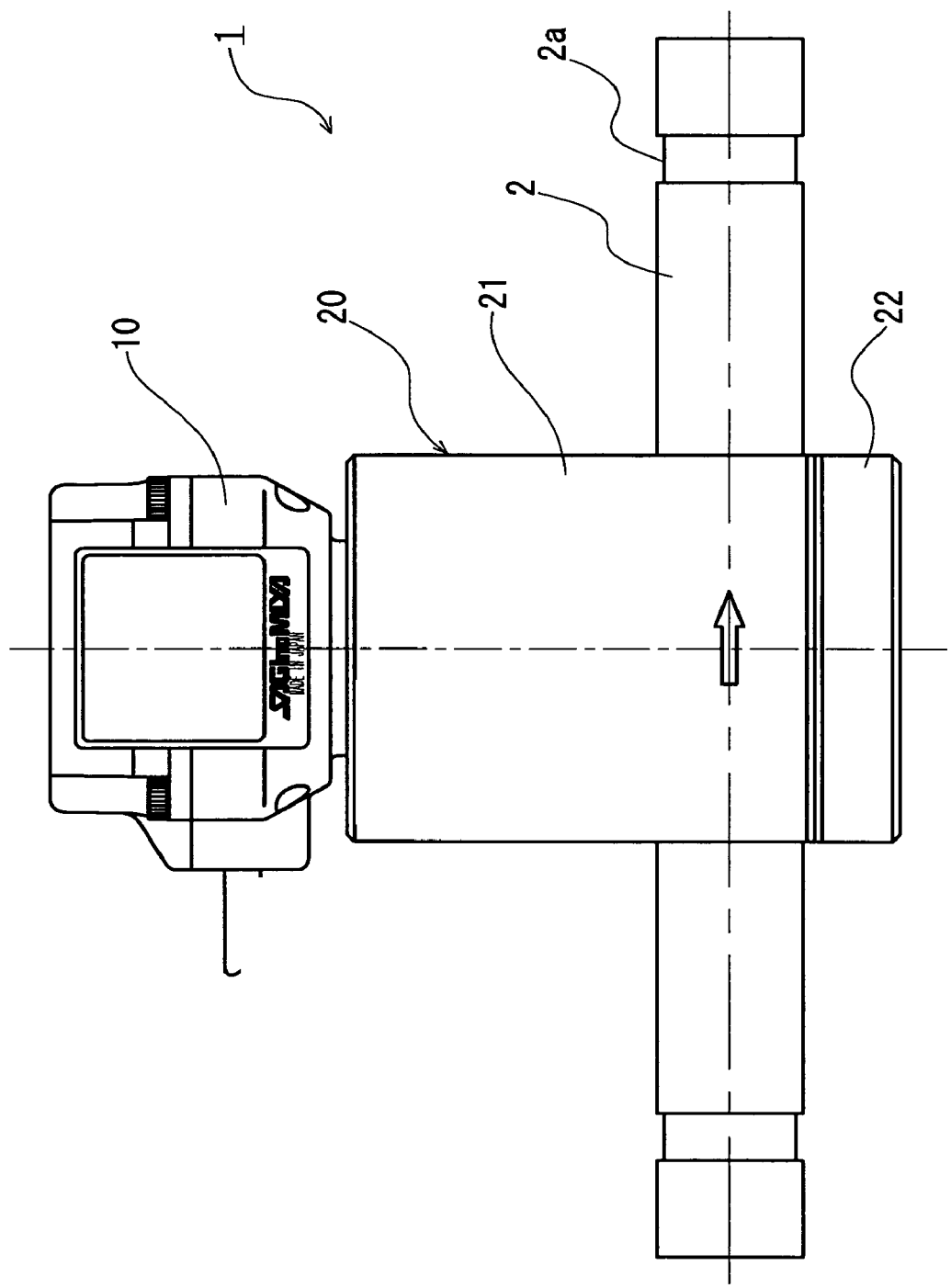
FIG. 2 is a front view showing the vortex flow meter shown in FIG. 1.
Figure 3:
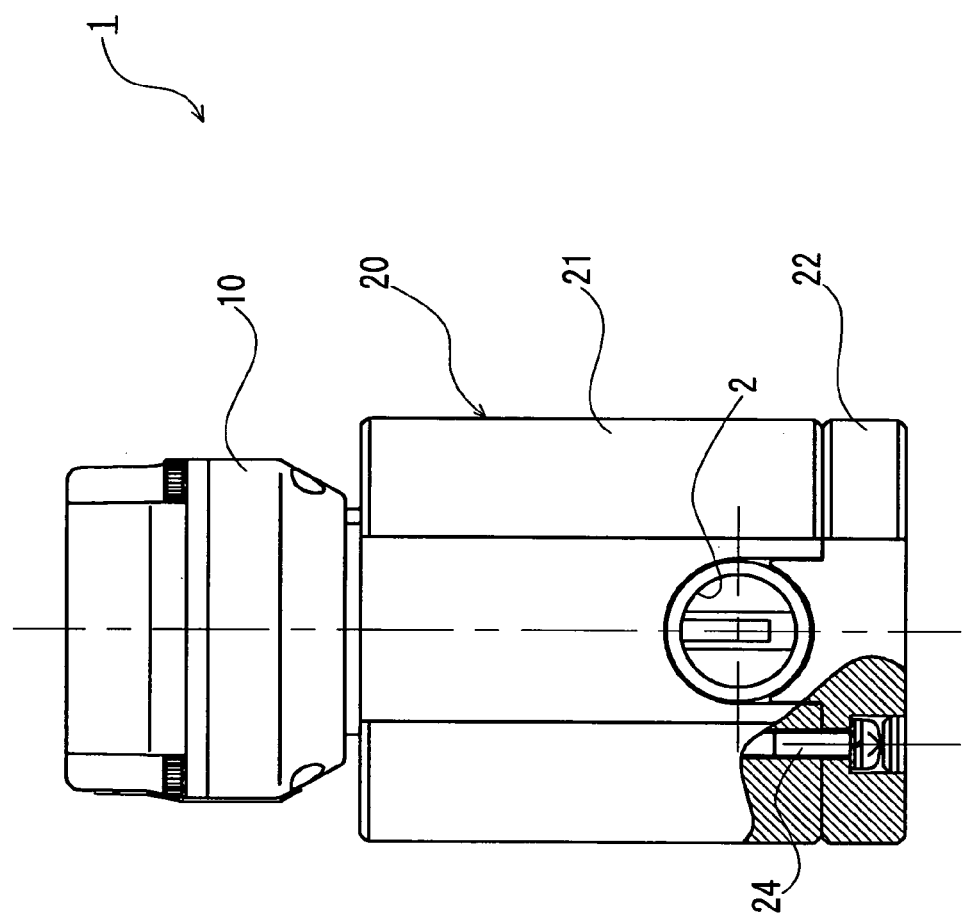
FIG. 3 is a side view showing the vortex flow meter shown in FIG. 1.
Figure 4:
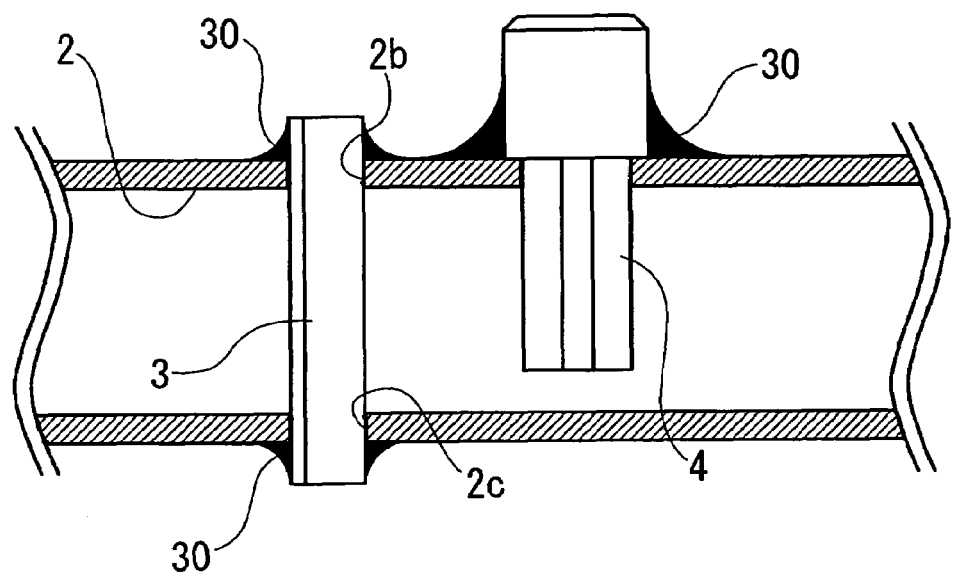
FIG. 4 is a partially enlarged view showing a measurement pipe line, a vortex generator, and a holder body of the vortex flow meter shown in FIG. 1.
Figure 5:
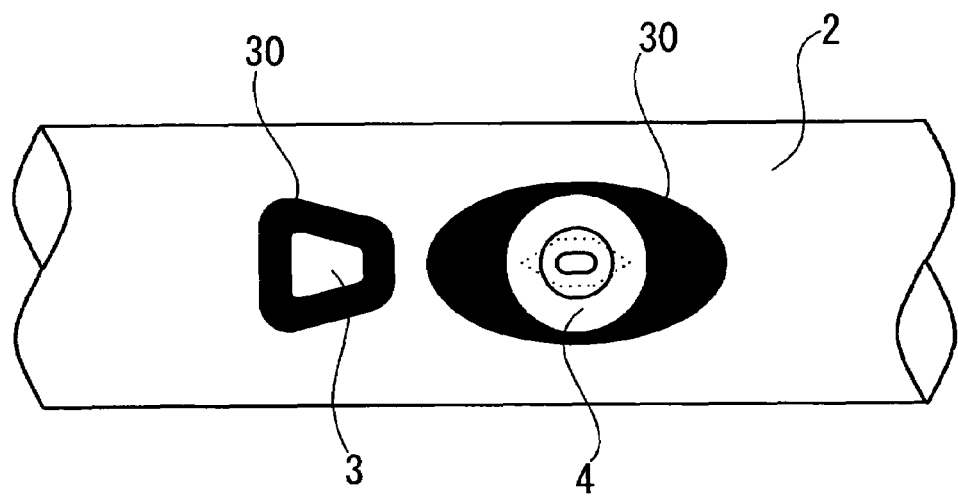
FIG. 5 is a top view showing the vortex flow meter shown in FIG. 4.

An embodiment of the present invention will be described below in detail with reference to the drawings. FIG. 1 is a cross-sectional view showing a vortex flow meter related to an embodiment of the present invention. FIG. 2 is a front view showing the vortex flow meter. FIG. 3 is a side view showing the vortex flow meter. FIG. 4 is a partially enlarged view showing the vortex flow meter. FIG. 5 is a top view showing the vortex flow meter shown in FIG. 4.

A vortex flow meter related to an embodiment is used to measure a flow rate of corrosive chemicals for cleaning in a semiconductor cleaning apparatus. As shown in FIG. 1, the vortex flow meter 1 is provided with a cylindrical measurement pipe line 2 made of a quartz glass. A vortex generator 3 for generating the Karman vortex is disposed perpendicularly to a flow direction of a fluid to be measured in the measurement pipe line 2.

A holder body 4 to which a detecting element 5 is fixed is disposed at the downstream of the vortex generator 3 in the pipe line, and an alternating force of the Karman vortex generated by the vortex generator 3 at a period depending on a flow rate of the fluid to be measured is detected by the detecting element 5. A detection signal output from the detecting element 5 is processed by a circuit section housed in a circuit section housing case 10, and a flow rate of the fluid to be measured is measured. In FIG. 1, a numeral 11 represents a cover member of the circuit section housing case 10, and a numeral 12 represents a power source line.

In the present embodiment, the measurement pipe line 2 is formed by a quartz glass. Since a coefficient of linear thermal expansion of a quartz glass is extremely small, $5.4 \times 10^{-7} \circ C.^{-1}$ ($1/240$ as compared to a fluorocarbon resin), a change in a cross sectional area of the pipe line from a normal temperature is extremely small even at a high temperature in the range of 160 to 170° C. that is required for a semiconductor cleaning apparatus. Consequently, a measurement error of a flow rate at a high temperature can be reduced to a degree that can be ignored.

Since a passage cross sectional area of a quartz glass is not changed by a pressure of a fluid in the measurement pipe line 2, a measurement accuracy can be stable against a change in a pressure. Moreover, since a temperature of a fluid in chemical cleaning is up to 170° C. and a pressure-withstand strength of the measurement pipe line 2 at about 170° C. is sufficiently large similarly to that at a normal temperature, it is not necessary to form a restriction configuration due to a withstand pressure for the vortex flow meter 1.

Moreover, corrosive chemicals do not corrode a quartz glass except for hydrofluoric acid and do not leak outside from the measurement pipe line 2, thereby preventing a failure due to corrosive chemicals.

Furthermore, since a contact section with corrosive chemicals in the vortex flow meter 1 is made of a quartz glass, a remaining of chemicals in the contact section due to a hydrophilic property that is a characteristic of a quartz glass will be prevented.

While a quartz glass is used as a material of the measurement pipe line 2 in the present embodiment, there can be mentioned a borosilicate glass as another material that can sufficiently reduce a measurement error of a flow rate due to a change in a temperature. By forming the measurement pipe line 2 with a material having a coefficient of linear thermal expansion of $3.25 \times 10^{-6 \circ}$ C.$^{-1}$ or less at a temperature in the range of 0 to 200° C., a change in a passage cross sectional area from a normal temperature is sufficiently small even at a high temperature that is required for a semiconductor cleaning apparatus, thereby sufficiently reducing a measurement error of a flow rate.

A proper quartz glass such as a fused quartz glass and a synthetic quartz glass can be used in consideration of a workability and a corrosiveness only in the case in which the above range of a coefficient of linear thermal expansion is satisfied.

As an example, for the measurement pipe line 2 having an inner diameter of 10 mm, in the case in which a rate of change of a passage cross sectional area against an increase in a temperature of 100° C. from 20° C. to 120° C. is simply calculated where a length of an inner circumference is $10\pi = 31.4$, a rate of change is 0.011% for a quartz glass (coefficient of linear thermal expansion: $5.4 \times 10^{-7 \circ}$ C.$^{-1}$), 0.065% for a borosilicate glass (Pyrex (registered trademark), coefficient of linear thermal expansion: $3.25 \times 10^{-6 \circ}$ C.$^{-1}$), and 2.4% for a PTFE resin (coefficient of linear thermal expansion: $12 \times 10^{-5 \circ}$ C.$^{-1}$).

Moreover, for the measurement pipe line 2 having an inner diameter of 16 mm, in the case in which a change in an inner diameter against an increase in a temperature of 80° C. from 20° C. to 100° C. is calculated by using the structural analysis software Ansys (registered trademark), a change is 16.0007 mm for a quartz glass (coefficient of linear thermal expansion: $5.4 \times 10^{-7 \circ}$ C.$^{-1}$) and 16.173 mm for a PTFE resin (coefficient of linear thermal expansion: $12 \times 10^{-5 \circ}$ C.$^{-1}$).

In any of the above cases, a rate of change of a passage cross sectional area in the case in which a quartz glass and a borosilicate glass are used is sufficiently small, both less than 0.1%, thereby sufficiently reducing a measurement error of a flow rate.

A U-shaped groove 2a is formed along a circumference of the measurement pipe line 2 at the peripheral section around the both edges of the measurement pipe line 2. The groove 2a is formed for attaching a dedicated joint between a glass-made measurement pipe line and a resin-made pipe line of an apparatus.

The vortex generator 3 is made of a quartz glass similarly to the measurement pipe line 2 and is disposed perpendicularly to a flow direction of a fluid to be measured in the measurement pipe line 2. The surface of the vortex generator 3 is processed in a smooth state. The both edge sides of the vortex generator 3 penetrate the measurement pipe line 2 at the both sides in a diameter direction and are fixed and sealed to the measurement pipe line 2 by welding in a twin holding manner by the welding portions 30.

Figure 6:
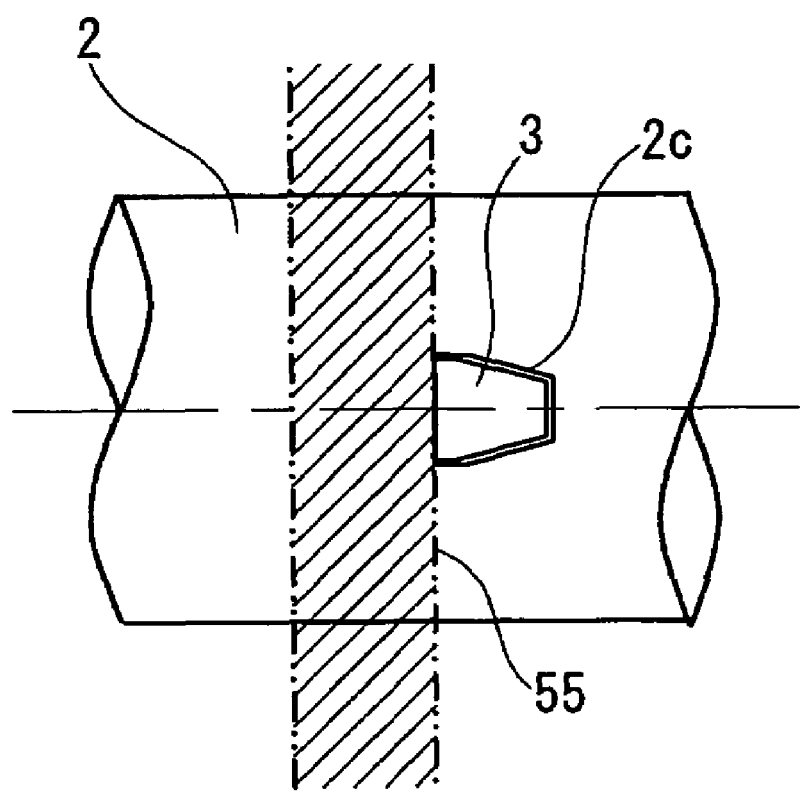
FIG. 6 is a view illustrating a process of welding the vortex generator to the measurement pipe line.

For welding, an upper hole 2b and a lower hole 2c of the measurement pipe line 2 are processed in a cross sectional shape equivalent to that of the vortex generator 3, e.g., by laser processing. As shown in FIG. 6, in the case in which the vortex generator 3 is welded to the measurement pipe line 2, the vortex generator 3 that has been inserted into the lower hole 2c (the upper hole 2b) of the measurement pipe line 2 is aligned to the position in which the Karman vortex is adequately generated.

A holder body 4 is made of a quartz glass similarly to the measurement pipe line 2 and is disposed at the downstream of the vortex generator 3 in the pipe line. The holder body 4 which penetrates the measurement pipe line 2 at one side is held by the measurement pipe line 2 in a cantilever manner, and is fixed and sealed to the measurement pipe line 2 by the welding portion 30. The holder body 4 and the vortex generator 3 are disposed with a predetermined space and in parallel with each other.

As shown in FIG. 1, a detecting element 5 is housed in the holder body 4 for detecting Karman vortex generated from the vortex generator 3. The detecting element 5 is electrically connected to a circuit section (not shown) through an electric wire 8. In FIG. 1, a numeral 6 represents an element sealing material, and a numeral 7 represents an electrode sealing agent for sealing an electrode portion of the detecting element. As the detecting element 5, a piezo-electric element can be used. In the present embodiment, lithium niobate capable of measuring a high-temperature fluid is used as the detecting element 5 in the present embodiment. A detection signal output from the detecting element 5 is sent to and processed by a circuit section housed in a circuit section housing case 10, and a flow rate is measured. More specifically, after an alternating signal generated by the Karman vortex is detected, by using a signal in which an amplification, an A/D conversion, a noise elimination with a filter and so on have been carried out, an arithmetic processing is carried out according to a specified program, and a flow rate of the fluid to be measured is measured.

As shown in FIG. 1, a case body 20 that is attached to the measurement pipe line 2 is composed of an upper case fixing body 21 and a lower case fixing body 22. The case body 20 is attached to the measurement pipe line 2 by holding the measurement pipe line 2 in an interposing manner through O rings 41 and 42 by using the upper case fixing body 21 and the lower case fixing body 22.

More specifically, the O rings 41 and 42 are attached to the specified positions of the measurement pipe line 2, and the measurement pipe line 2 is interposed by the upper case fixing body 21 and the lower case fixing body 22 in which semi-circular grooves into which the O rings 41 and 42 are fitted have been formed, in such a manner that the O rings 41 and 42 are fitted into the grooves. At the specified positions of the measurement pipe line 2 to which the O rings 41 and 42 are attached, a banded print is formed on a circumference as an identification or a groove for determining an attached position (circumferential groove or cut grooves of two points) is formed, thereby enabling the O rings 41 and 42 to be easily attached to the specified positions.

As shown in FIG. 3, the case body 20 is attached to the measurement pipe line 2 by fixing the upper case fixing body 21 to the lower case fixing body 22 with a screw 24 from a side of the lower case fixing body 22 in an integrating manner. A protruded section of the vortex generator 3 from the measurement pipe line 2 is disposed in a concave 22a of the lower case fixing body 22.

The holder body 4 is fixed to the upper case fixing body 21 by an O ring 43. The O ring 43 also functions as a sealing member for preventing a corrosive chemical atmosphere from penetrating from the outside to the circuit section housing case 10.

Figure 7:
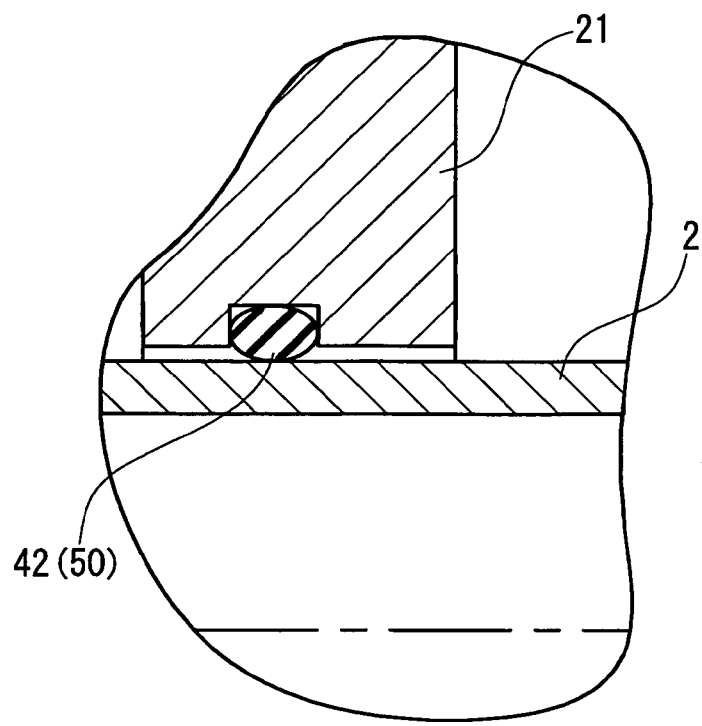
FIG. 7 is a cross-sectional view illustrating a fixed state of the measurement pipe line and the case body.

As described above, the measurement pipe line 2 is fixed to the upper case fixing body 21 through the O rings 41 and 42 (FIG. 7 shows the state in which the measurement pipe line 2 and the upper case fixing body 21 are fixed while interposing the O ring 42). Consequently, even in the case in which a mechanical vibration is applied to the vortex flow meter 1, the mechanical vibration is absorbed by the O rings 41 and 42, and an influence to the measurement can be reduced, thereby reducing a measurement error caused by the mechanical vibration.

Moreover, the measurement pipe line 2 is not directly in contact with the case body 20, and the measurement pipe line 2 is indirectly in contact with the case body 20 through the O rings 41 and 42 with a gap between the measurement pipe line 2 and the case body 20 (see FIG. 7). Consequently, even in the case in which a linear expansion of the measurement pipe line 2 occurs due to a heat from a fluid to be measured, a contact pressure due to a direct contact is not applied to the measurement pipe line 2 and the case body 20. Accordingly, even in the case in which a linear expansion of the measurement pipe line 2 occurs, a stress caused by the linear expansion is absorbed by the O rings 41 and 42, thereby preventing a damage of the case body 20 and the measurement pipe line 2 due to an excess pressure applied to them.

As a material of the O rings 41 and 42 forming an elastic portion 50, a resin material having elasticity such as Teflon (registered trademark), a rubber material or the like can be properly selected depending on the above operation.

Figure 8:
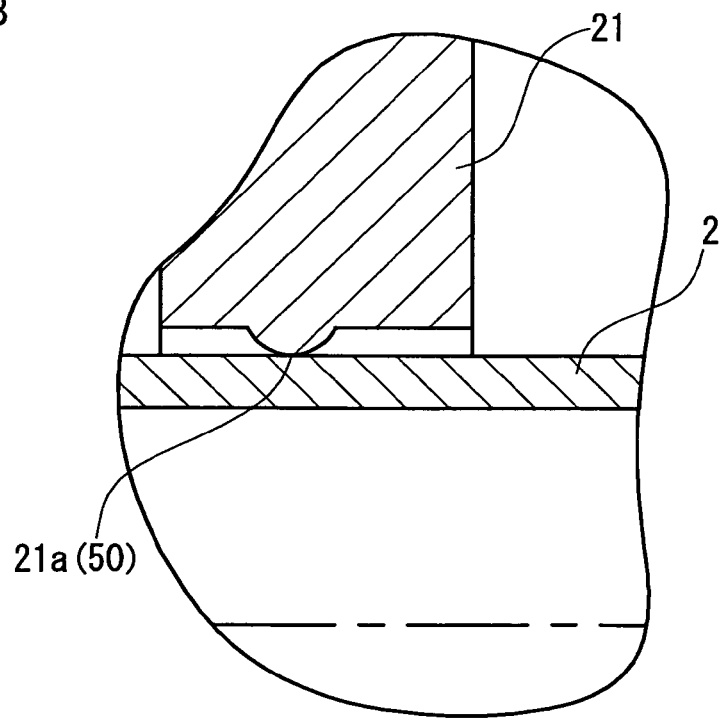
FIG. 8 is a cross-sectional view illustrating a fixed state of the measurement pipe line and the case body.

Moreover, as shown in FIG. 8, at a contact section with the measurement pipe line 2, a convex 21a can be formed on the inner circumferential section of the upper case fixing body 21 made of a resin in an integrating manner to be the elastic portion 50 (similar for the lower case fixing body 22).

Figure 9:
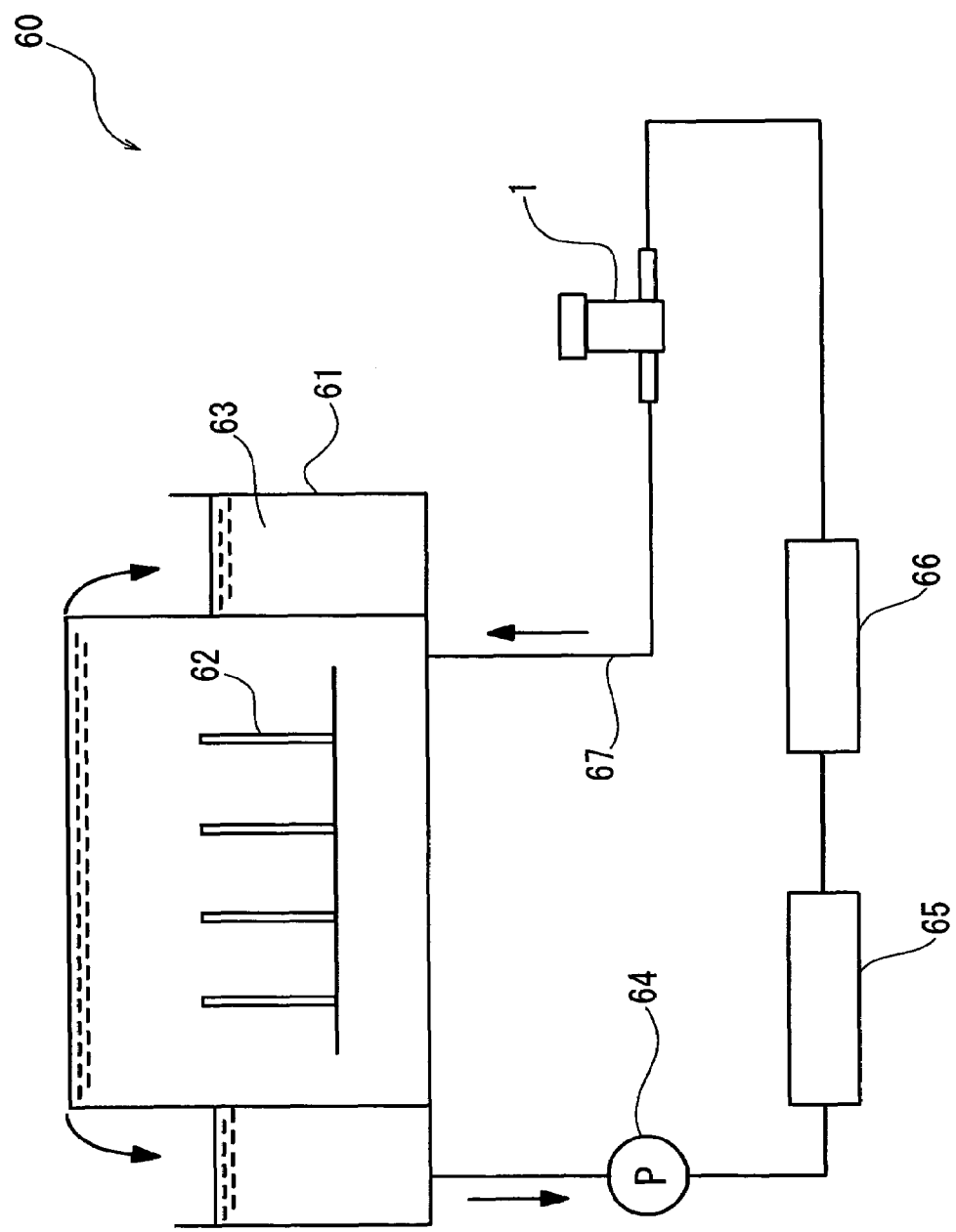
FIG. 9 is a view showing a schematic configuration of a semiconductor wafer cleaning system.

FIG. 9 is a view showing a schematic configuration of a semiconductor wafer cleaning system using the vortex flow meter related to the present invention. A semiconductor wafer cleaning system 60 is for cleaning a semiconductor wafer 62 such as a silicon wafer. The semiconductor wafer 62 to be cleaned is disposed in a cleaning chamber 61 housing a cleaning solvent 63 (for instance, $H_2SO_4+H_2O_2$).

The cleaning solvent 63 is supplied to the cleaning chamber 61 from a pipe line 67, and the cleaning solvent 63 that is overflown from an inner chamber housing the semiconductor wafer 62 is emitted from an outer chamber to circulate the cleaning solvent 63. In the figure, a numeral 64 represents a pump, a numeral 65 represents a heater, and a numeral 66 represents a filter for the cleaning solvent 63.

The vortex flow meter 1 is connected to a part of the pipe line 67 that circulates the cleaning solvent 63 to the cleaning chamber 61. The vortex flow meter 1 measures and monitors a flow rate of the cleaning solvent 63 that is heated up to, for instance, 100 to 120° C., moreover 160 to 170° C. by the heater 65.

While the preferred embodiments of the present invention have been described above, the present invention is not restricted to the embodiments, and various changes and modifications can be thus made without departing from the scope of the present invention.

What is claimed is:

1. A vortex flow meter comprising:
   a vortex generator that is disposed perpendicularly to a flow direction of a fluid to be measured in a measurement pipe line and that generates the Karman vortex, and
   a detecting element that is fixed to a holder body disposed at the downstream of the vortex generator in the pipe line and that detects an alternating force of the Karman vortex,
   wherein the measurement pipe line, the vortex generator, and the holder body are made of a material having a coefficient of linear thermal expansion of $3.25 \times 10^{-6}$°$C^{-1}$ or less at a temperature in the range of 0 to 200° C.

2. A vortex flow meter as defined in claim 1, wherein the vortex generator and the holder body are fixed to the measurement pipe line by welding in an integrating manner.

3. A vortex flow meter as defined in claim 2, wherein the measurement pipe line, the vortex generator, and the holder body are made of the same glass material.

4. A vortex flow meter as defined in claim 3, wherein the measurement pipe line, the vortex generator, and the holder body are made of a quartz glass.

5. A vortex flow meter as defined in claim 2, wherein a groove is formed along a circumference of the measurement pipe line at the peripheral section around the both edges of the measurement pipe line.

6. A vortex flow meter as defined in claim 2, wherein the measurement pipe line, the vortex generator, and the holder body are made of a material that prevents corrosive chemicals from leaking.

7. A vortex flow meter as defined in claim 1, further comprising a case body that is attached to the measurement pipe line by holding the measurement pipe line in an interposing manner through an elastic portion by using an upper case fixing body and a lower case fixing body that form the case body that is attached to the measurement pipe line.

8. A semiconductor wafer cleaning system comprising the vortex flow meter as defined in claim 1.

* * * * *